(12) United States Patent
Harris (10) Patent No.: US 8,365,799 B2
(45) Date of Patent: Feb. 5, 2013

(54) WINDOW COVERING CONFIGURED TO BE MAGNETICALLY ATTACHED TO A WINDOW FRAME OF A VEHICLE

(75) Inventor: Victor Harris, Dubai (AE)

(73) Assignee: NSV LLC, Dubai (AE)

( * ) Notice: Subject to any disclaimer, the term of this patent is extended or adjusted under 35 U.S.C. 154(b) by 61 days.

(21) Appl. No.: 13/050,154

(22) Filed: Mar. 17, 2011

(65) Prior Publication Data

US 2012/0234509 A1 Sep. 20, 2012

(51) Int. Cl.
*B60J 1/08* (2006.01)

(52) U.S. Cl. ............. 160/105; 160/370.21; 160/DIG. 16

(58) Field of Classification Search ................... 160/105, 160/370.21, 369, 402, DIG. 16; 296/97.7, 296/97.9
See application file for complete search history.

(56) References Cited

U.S. PATENT DOCUMENTS

| | | | | |
|---|---|---|---|---|
| 2,595,833 A | * | 5/1952 | Flaherty | 160/369 |
| 3,679,505 A | * | 7/1972 | Hinderaker et al. | 156/71 |
| 3,805,872 A | * | 4/1974 | Lorber | 160/354 |
| 4,409,758 A | * | 10/1983 | Dickerson et al. | 49/463 |
| 4,561,223 A | * | 12/1985 | Gold et al. | 52/202 |
| 4,802,523 A | * | 2/1989 | Scholten et al. | 160/354 |
| 5,090,469 A | * | 2/1992 | Boulanger | 160/368.1 |
| 6,073,675 A | * | 6/2000 | Dannaher | 160/369 |
| 2005/0264032 A1 | | 12/2005 | Lederle et al. | |
| 2009/0183844 A1 | * | 7/2009 | Alkhoury et al. | 160/369 |
| 2010/0300036 A1 | | 12/2010 | Gunther et al. | |

FOREIGN PATENT DOCUMENTS

CN 2635422 Y 8/2004

* cited by examiner

*Primary Examiner* — David Purol
(74) *Attorney, Agent, or Firm* — Quinn Law Group, PLLC (57) ABSTRACT

A window covering is configured for attachment to a window frame of a vehicle to cover an opening defined in the window frame. The window covering includes a casing, a panel, a first magnet, and a second magnet. The casing includes a first member and a second member. The casing includes a ferromagnetic material. The panel is attached to first and second members and covers the hole. The first magnet and second magnet are magnetically attached to the respective first member and second member. The first and second magnets are configured to be magnetically attached to the window frame. The magnets are permanent magnets. Each magnet is configured to exert a pull force sufficient to retain the window covering to the window frame of the vehicle such that the casing of the window covering does not move relative to the window frame during motion of the vehicle.

17 Claims, 8 Drawing Sheets

WINDOW COVERING CONFIGURED TO BE MAGNETICALLY ATTACHED TO A WINDOW FRAME OF A VEHICLE

TECHNICAL FIELD

The invention relates to a window covering configured to be magnetically attached to a window frame of a vehicle.

BACKGROUND

Vehicles may include one or more visors for protecting occupants by shading them from the sun or other bright light. Some visors can be lowered over part of the windshield by the driver or front passenger to block the sun and some may be swung sideways to block sun entering windows of front doors of the vehicle.

Other sun shades may be adhered directly to the window glass of the vehicle to block the sun. Some of these sun shades may be cut and adhered as a film to the window glass. Other types of sun shades may be attached with suction cups and removed when the window glass needs to be lowered and raised.

SUMMARY

A window covering is configured for attachment to a window frame of a vehicle to at least partially cover an opening defined in the window frame. The window covering includes a casing, a panel, a first magnet, and a second magnet. The casing includes a first member and a second member extending in spaced relationship to the first member to define a hole therebetween. The casing is rigid and includes a ferromagnetic material. The panel is operatively attached to each of the first member and the second member and covers the hole. The first magnet is magnetically attached to the first member and is configured to be magnetically attached to the window frame. The second magnet is magnetically attached to the second member and is configured to be magnetically attached to the window frame. Each magnet is a permanent magnet. Each magnet is configured to exert a pull force sufficient to retain the window covering to the window frame of the vehicle such that the casing of the window covering does not move relative to the window frame during motion of the vehicle.

A window covering system includes a window frame of a vehicle and a window covering. The window frame includes a header and a footer. The window covering is configured for attachment to the header and the footer of the window frame to at least partially cover an opening defined between the header and the footer. The window covering includes a casing, a panel, a first magnet, and a second magnet. The casing includes a first member and a second member extending in spaced relationship to the first member to define a hole therebetween. The casing is rigid and includes a ferromagnetic material. The panel is operatively attached to each of the first member and the second member and covers the hole. The first magnet is magnetically attached to the first member and is also configured to be magnetically attached to the header of the window frame. The second magnet is magnetically attached to the second member and is also configured to be magnetically attached to the footer of the window frame. Each magnet is a permanent magnet. Additionally, each magnet is configured to exert a pull force sufficient to retain the window covering to the respective header and footer of the window frame of the vehicle such that the casing of the window covering does not move relative to the window frame during motion of the vehicle.

The above features and advantages and other features and advantages of the present invention are readily apparent from the following detailed description of the best modes for carrying out the invention when taken in connection with the accompanying drawings.

DETAILED DESCRIPTION

Figure 1:
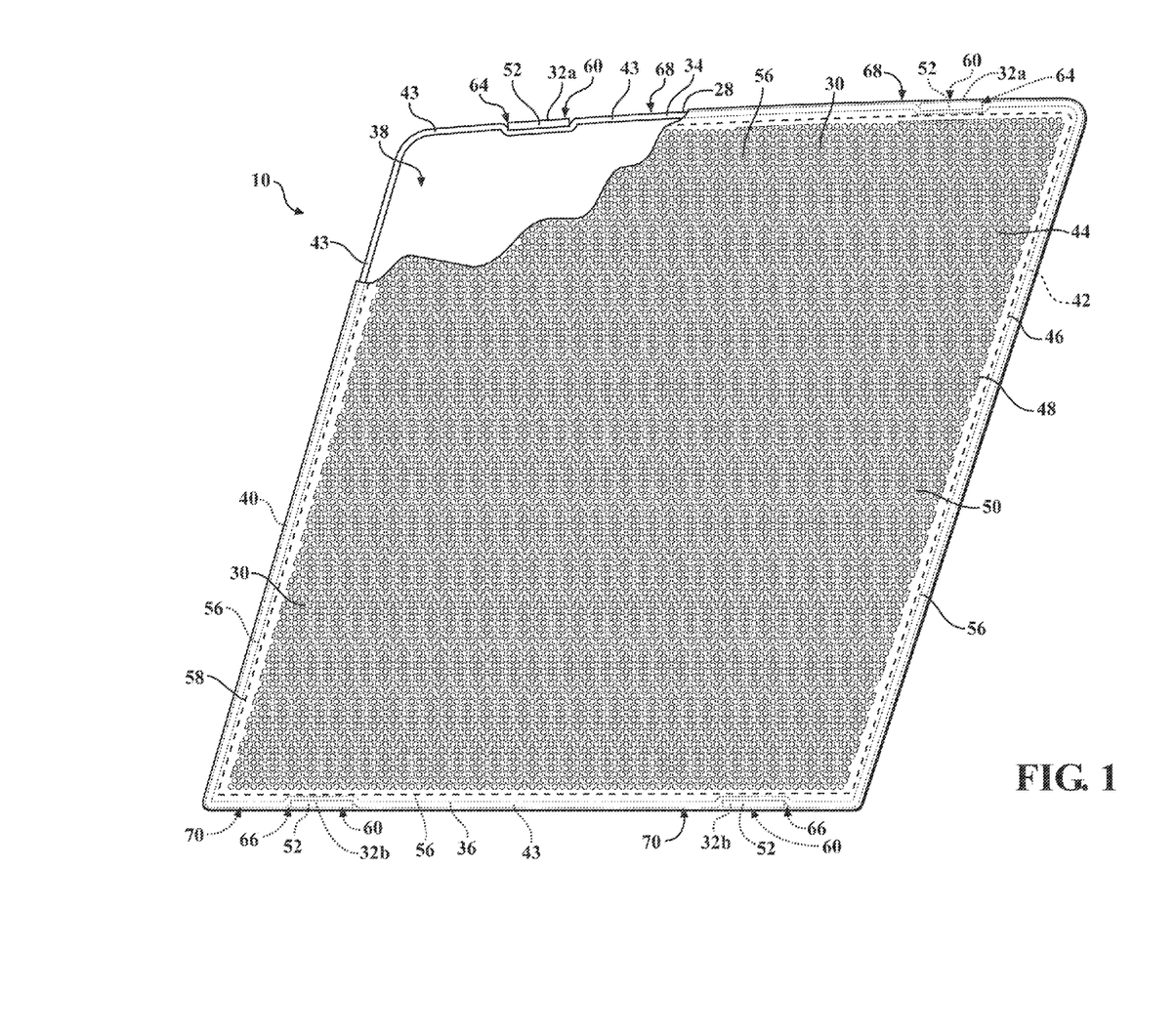
FIG. 1 is a schematic side view of a window covering including a plurality of magnets.
Figure 2A:
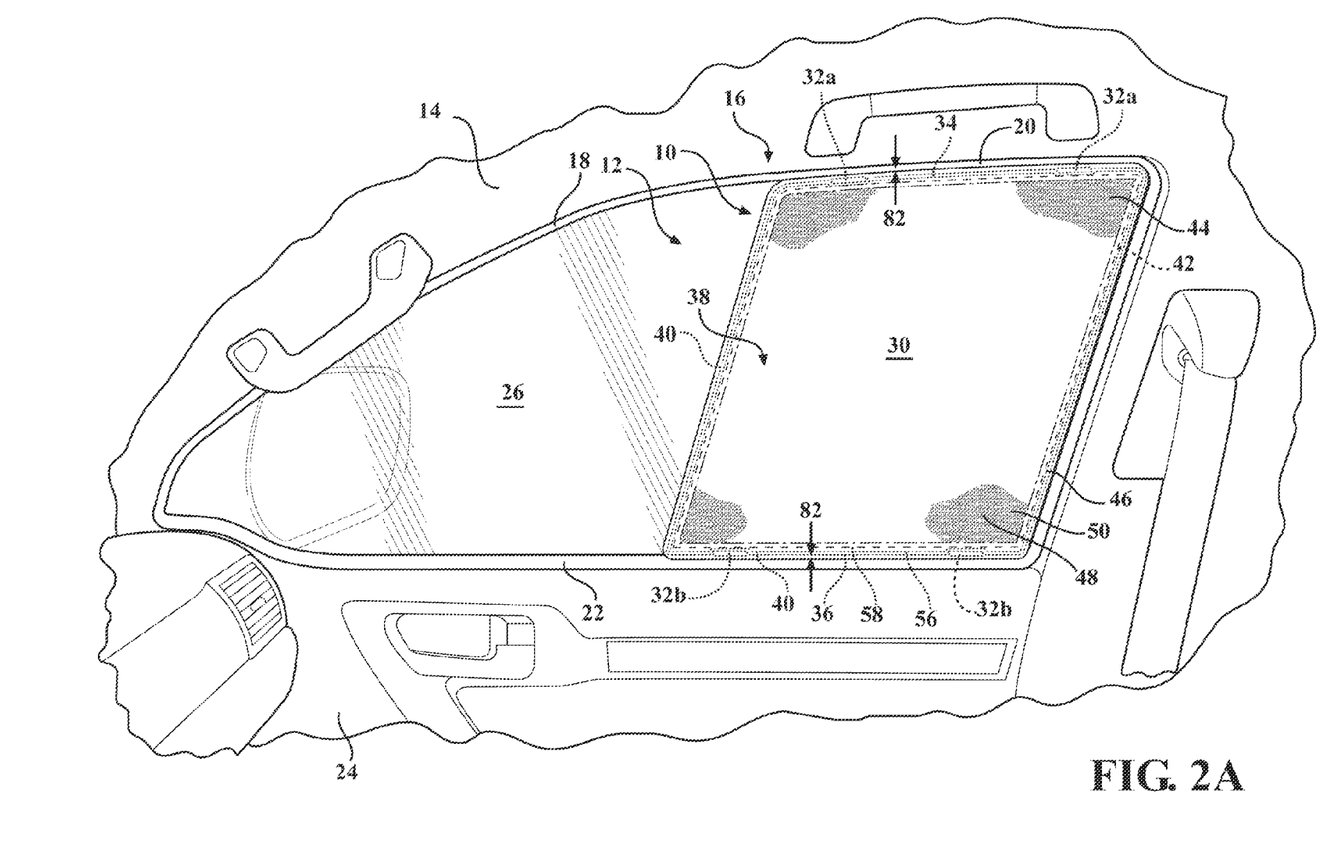
FIG. 2A is a schematic side view of a window covering system including the window covering of FIG. 1 magnetically attached to a window frame of a vehicle by the plurality of magnets.
Figure 3A:
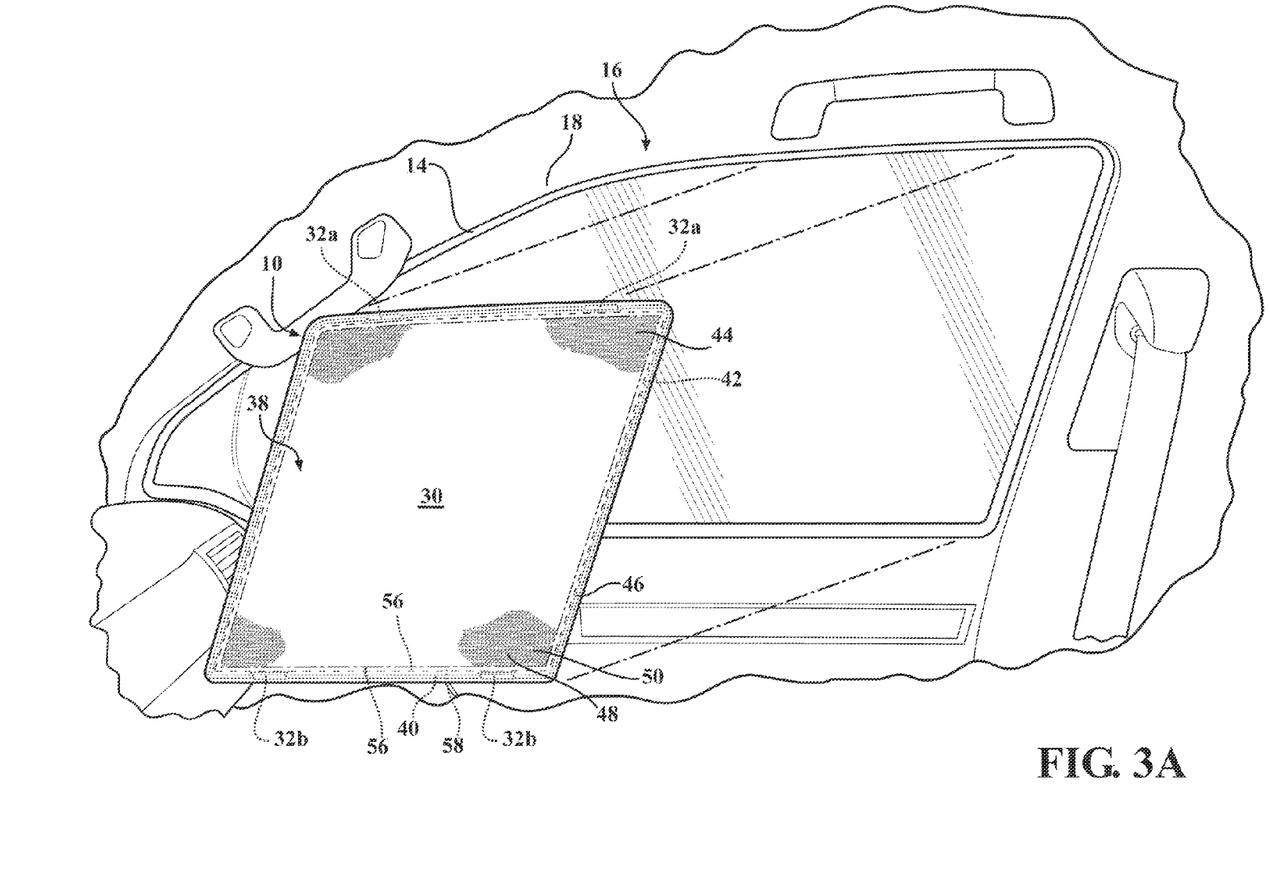
FIG. 3A is a schematic side view of the window covering of FIG. 2 detached from the window frame of the vehicle.

Referring to the Figures, wherein like reference numerals refer to like elements, a window covering 10 is shown generally at 10 in FIG. 1 and is configured for selectively covering (as shown in FIG. 2A) and uncovering (as shown in FIG. 3A) an opening 12 defined in a vehicle 14.

Figure 2B:
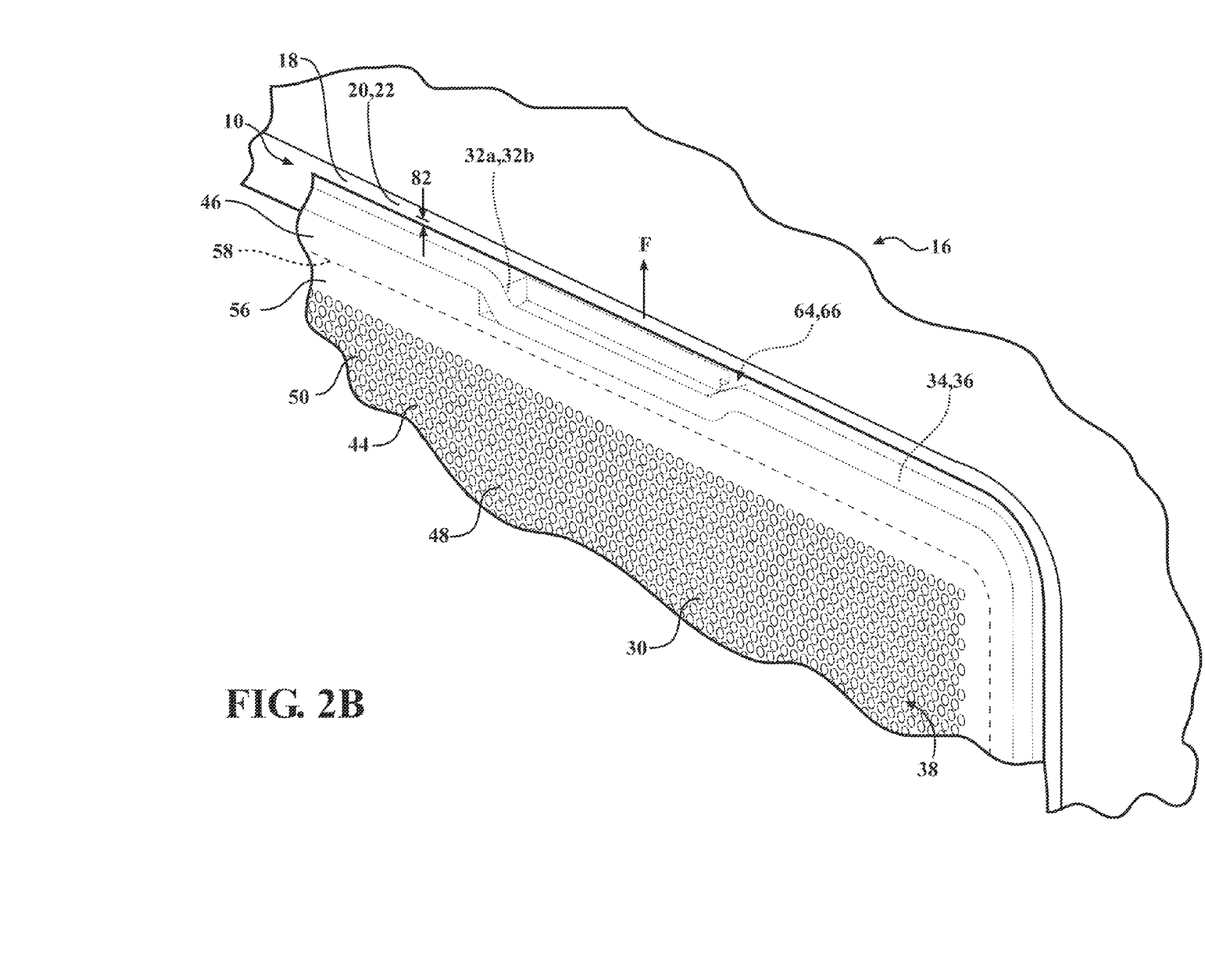
FIG. 2B is a schematic partial side view of the window covering system of FIG. 2A with the window covering magnetically attached to the window frame.
Figures 3B, 4:
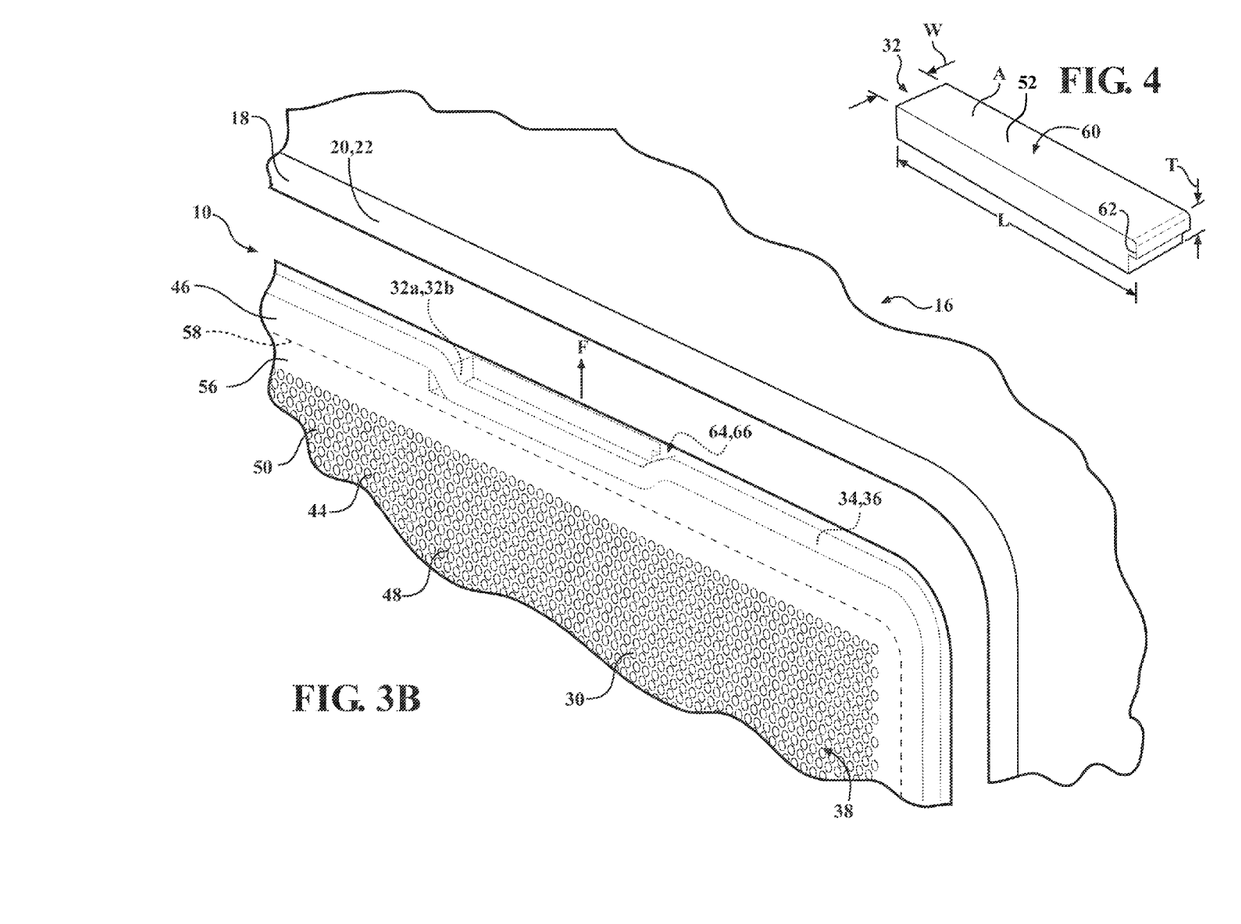
FIG. 3B is a partially exploded schematic side view of the window covering system of FIG. 3A with the window covering detached from the window frame.
FIG. 4 is a schematic perspective view of one of the magnets of the window covering of FIG. 1.

Referring to FIGS. 2A, 2B, 3A, and 3B, the vehicle 14 includes a window covering system 16 having a window frame 18, defining the opening 12, and the window covering 10. The window frame 18 has a header 20 and a footer 22 which define the opening 12 therebetween. The window covering 10 is configured to be magnetically attached to the header 20 and the footer 22 of the window frame 18 to at least partially cover the opening 12, as shown in FIG. 2A. The window frame 18 may be formed as a part of a vehicle 14 door 24, such as a front door of the vehicle 14. It should be appreciated that the window frame 18 may also be part of a rear door (not shown) of the vehicle 14 or any other opening 12 defined in the vehicle 14. Since the window covering 10 is magnetically attached to only the header 20 and the footer 22 of the window frame 18, a corresponding window 26 of the vehicle door 24 is still capable of being rolled up or down, without disturbing or otherwise interfering with the placement of the widow covering 10. Additionally, as will be explained in more detail below, the window covering 10 is easily detached from the header 20 and footer 22 of the window frame 18, as shown in FIGS. 3A and 3B, when the opening 12 of the window 26 needs to be accessed, e.g., to allow access to a parking ticket machine, fast food drive-thru, and the like. Likewise, once access to the opening 12 is no longer required, the window covering 10 is quickly and easily magnetically reattached to the window frame 18.

The window coverings 10 are configured to be sized to fit the window frames 18 of specific model vehicles 14. More specifically, the window coverings 10 are sized such that, once attached to the window frame 18, any gap 82 defined between the window covering 10 and the respective header 20 and footer 22 is held substantially equal to a predefined tolerance. By way of a non-limiting example, the tolerance may be limited to be substantially equal to 3 mm. It should be appreciated that other tolerances may also be obtained. The window coverings 10 are formed based on measurements of the opening 12 defined between the header 20 and footer 22 of the window frames 18 of the specific vehicle 14. The specific vehicle 14 may be based on model and model year. The measurements may be obtained based on tracing the window opening 12, coordinate numerical control (CNC) measurement, and the like. These measurements are used to create the window covering 10 that is customized to fit the specific vehicle 14 which may be based on model and model year.

Referring again to FIG. 1, the window covering 10 includes a casing 28, a panel 30, and a plurality of magnets 32. The casing 28 includes a first member 34 and a second member 36 extending generally horizontally in spaced relationship to the first member 34 to define a hole 38 therebetween. The casing 28 may also include a third member 40 and a fourth member 42. The third member 40 extends generally vertically to interconnect the first member 34 and the second member 36. The fourth member 42 extends vertically in spaced relationship to the third member 40 and interconnects the first member 34 and the second member 36. The first member 34, the second member 36, the third member 40, and the fourth member 42 form the casing 28 and define the hole 38 therebetween. Each member 34, 36, 40, 42 is substantially rigid and the members 34, 36, 40, 42 are interconnected to one another such that the casing 28 is also substantially rigid. The casing 28 includes a ferromagnetic material 43. The ferromagnetic material 43 may be steel, such as mild steel, and the like. The ferromagnetic material 43 is configured such that there is a sufficient pull force F between each of the magnets 32a, 32b and the respective first member 34 and second member 36 to retain the window covering 10 to the window frame 18.

The panel 30 is operatively attached to the first member 34, the second member 36, the third member 40, and the fourth member 42 such that the panel 30 covers the hole 38. The panel 30 includes a covering portion 44 and a border 46. The covering portion 44 is configured to substantially cover the hole 38. The border 46 is configured to operatively attach the covering portion 44 to the casing 28. The covering portion 44 may be formed from a material 48, such as a fabric. More specifically, the fabric may include a nylon material, such as a nylon mesh 50, which extends to cover the hole 38. The nylon mesh 50 is configured to form a screen which allows visibility and airflow therethrough. Therefore, the air is allowed to flow between an interior of the vehicle 14 and an exterior of the vehicle 14, through the nylon mesh 50, while also providing an occupant of the vehicle 14 the benefits of a sun shade. However, other materials 48 in addition to the nylon mesh 50 may also be used. The covering portion 44 may include edges 56 which extend along a perimeter. The edges 56 are generally disposed proximate each of the members 34, 36, 40, 42. The border 46 may be formed from a textile, such as cloth. The border 46 may be folded onto itself and disposed to extend about each of the members 34, 36, 40, 42 of the casing 28, the respective magnets 32a, 32b, and the respective edge 56 of the covering portion 44. The border 46 may be folded onto itself and stitched to the corresponding edges 56 of the covering portion 44 with stitching 58 such that the covering portion 44 is held substantially taut and retained across the hole 38. By wrapping each of the members 34, 36, 40, 42 such that the magnets 32a, 32b are covered by portions of the panel 30, the panel 30 is disposed between each of the magnets 32a, 32b and the window frame 18 when the window covering 10 is attached to the window frame 18 of the vehicle 14. This prevents the magnets 32a, 32b from directly contacting the window frame 18, which may otherwise cause scratching or damage to the window frame 18. Additionally, covering the magnets 32a, 32b with the border 46 captures and retains each magnet 32a, 32b to the window covering 10, which prevents the magnets 32a, 32b from becoming accidentally dislodged from the casing 28 when the window covering 10 is detached from the window frame 18. It should be appreciated that the panel 30 may be formed as a single piece, such that the covering portion 44 and the border 46 are a single continuous piece. Alternatively, the panel 30 may be formed such that the covering portion 44 and the border 46 are separate pieces that are connected to one another via the stitching 58.

Still referring again to FIG. 1, the magnets 32 (FIG. 4) may include a pair of first magnets 32a and a pair of second magnets 32b. It should be appreciated that the window covering 10 may include more or less magnets 32a, 32b. The first magnets 32a are magnetically attached to the first member 34 and are also configured to be magnetically attached to the header 20 of the window frame 18, as shown in FIGS. 2A and 2B. The second magnets 32b are magnetically attached to the second member 36 and are configured to be magnetically attached to the footer 22 of the window frame 18.

Referring to FIG. 4, the magnets 32 are permanent magnets which are configured to exert a pull force F sufficient to retain the window covering 10 to the window frame 18 such that the casing 28 of the window covering 10 does not move relative to the window frame 18 during motion of the vehicle 14. More specifically, as the vehicle 14 is driving, the pull force F exerted by the magnets 32 is sufficient to magnetically retain the window covering 10 to the window frame 18 such that the window covering 10 remains stationary, relative to the window frame 18, even when the vehicle 14 is driving on rough roads, driving through pot holes, accelerating, decelerating, exposed to strong winds, and the like. The magnets 32 include a rare earth metal 52, such as neodymium and the like. The magnets 32 may be neodymium magnets which include an alloy of neodymium, iron, and boron.

Referring to FIG. 4, each of the magnets 32 may be generally block shaped and include a length L, a width W, and a thickness T. The magnets 32 present an outer magnet surface 60 configured to face and be magnetically attached to the window frame 18. The magnets 32 may also be formed to include a ledge 62 extending along the length L of the outer magnet surface 60. Magnets 32 having other shapes may also be used. In order to provide sufficient pull force F, the outer magnet surfaces 60 may each have an area A substantially equal to 125 square centimeters. The area A is defined by the length L and the width W of the magnet 32. By way of a non-limiting example, the length L may be 25 centimeters (cm), the width W may be 5 cm, and the thickness T may be 3 cm.

Referring again to FIG. 1, the first member 34 of the casing 28 defines a pair of first channels 64 and the second member 36 of the casing 28 defines a pair of second channels 66. The first member 34 presents a first outer member surface 68 and the second member 36 presents a second outer member surface 70. The first magnets 32a are disposed in the first channel 64 and are magnetically attached to the first member 34 such that the first outer member surface 68 of the first member 34 and the outer magnet surface 60 of the first magnets 32a are substantially planar with one another. Likewise, the second magnets 32b are disposed in the second channel 66 and are magnetically attached to the second member 36 such that the second outer member surface 70 of the second member 36 and the outer magnet surface 60 of the second magnets 32b are substantially planar with one another.

Figures 5, 6:
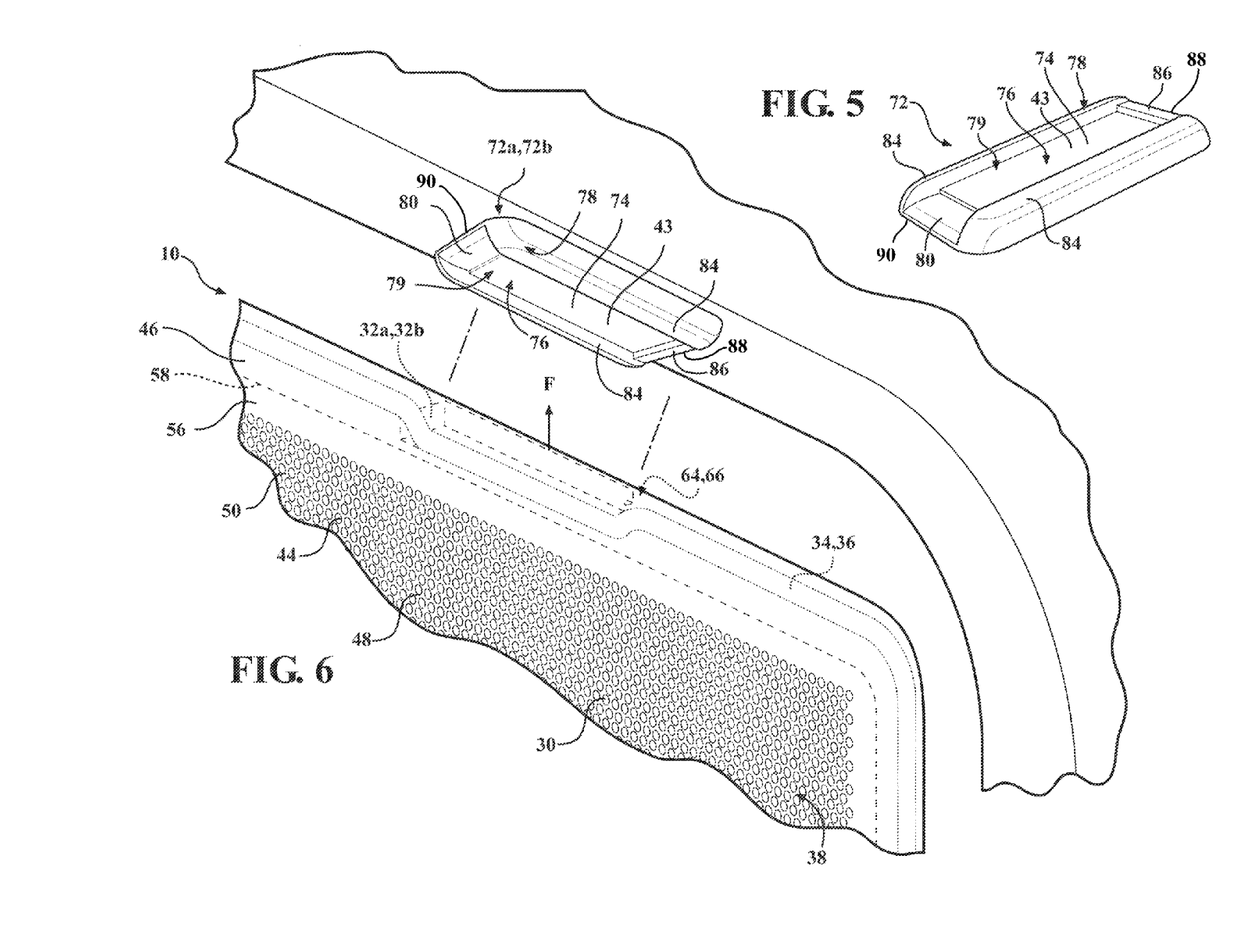
FIG. 5 is a schematic perspective view of an attachment clip configured for being secured to the window frame and for use with the window covering of claim 1, in an alternative embodiment of the window covering system of FIGS. 2 and 3.
FIG. 6 is a schematic partially exploded perspective view of the alternative embodiment of the window covering system of FIG. 2 with the window covering magnetically attached to the attachment clip of FIG. 5, where the attachment clip is secured to the window frame.
Figure 7:
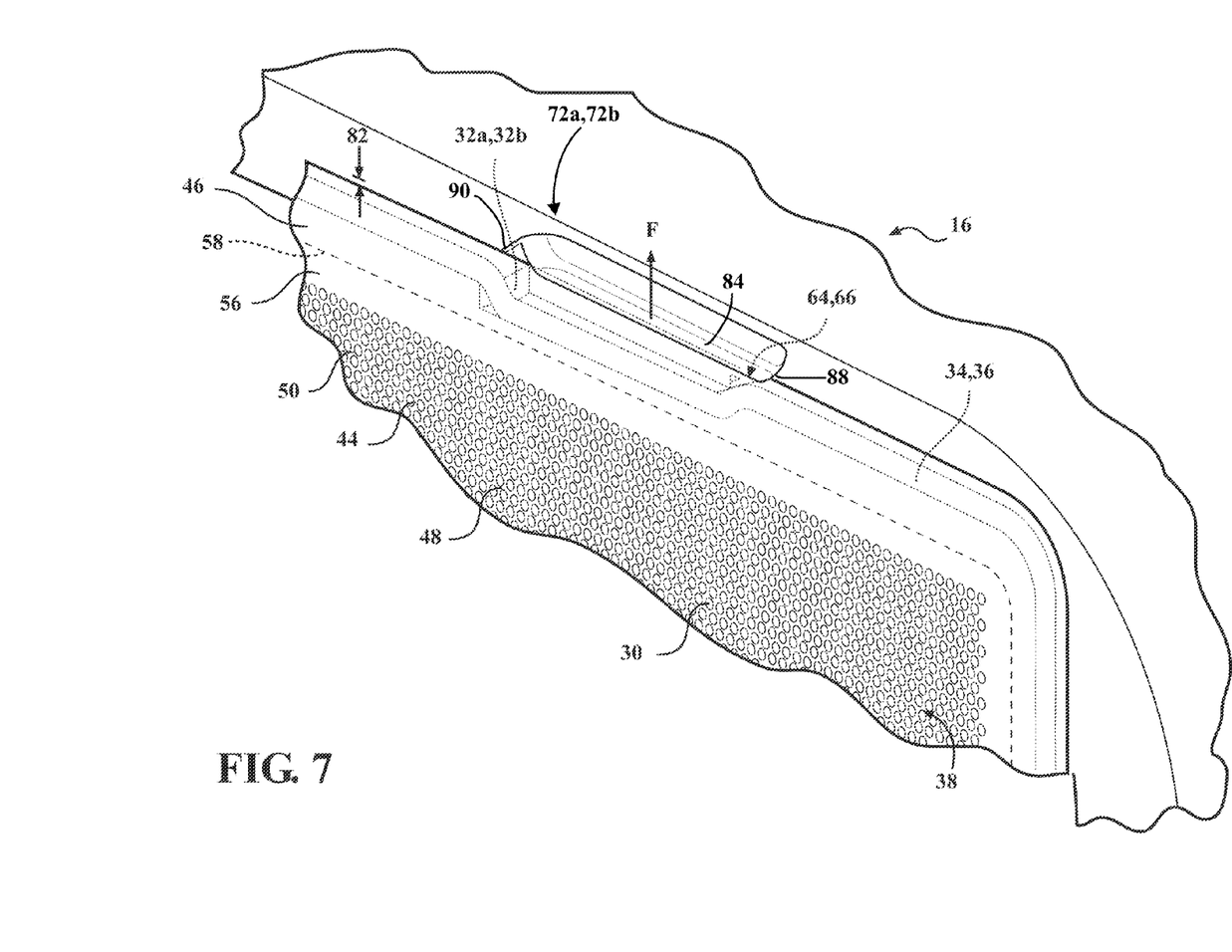
FIG. 7 is a schematic perspective view of the alternative embodiment of the window covering system of FIG. 3, with the window covering detached from the attachment clip of FIG. 5 and the attachment clip secured to the window frame.
Figure 8:
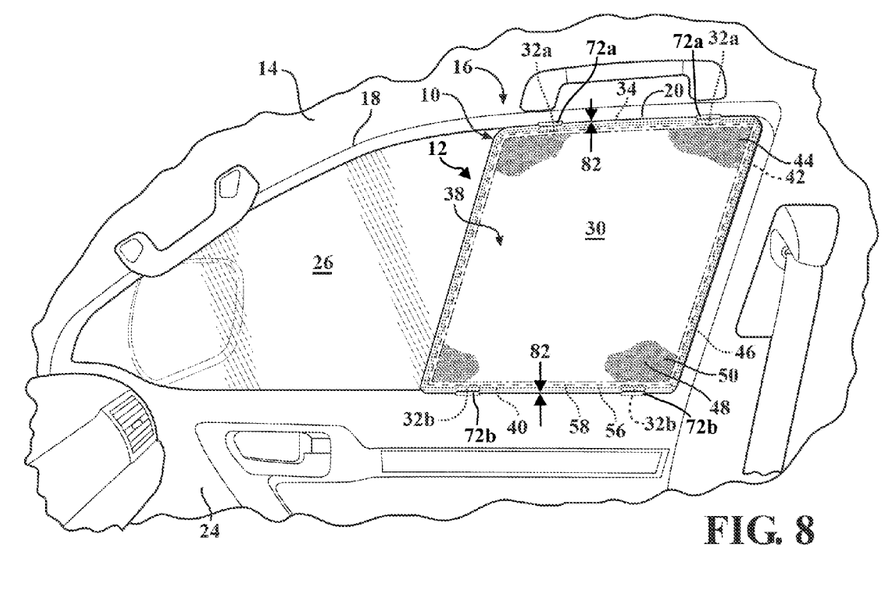
FIG. 8 is a schematic side view of the alternative embodiment of the window covering system of FIG. 3 with the window covering magnetically attached to the attachment clips of FIG. 5.

Referring to the embodiment shown in FIGS. 5-8, when the header 20 and/or the footer 22 are formed from a non-ferromagnetic material 43, e.g., plastic, or are otherwise covered by a non-ferromagnetic material 43, attachment clips 72, shown in FIG. 5. Referring to FIGS. 6-8, the attachment clips 72 may include a pair of first attachment clips 72a and a pair of second attachment clips 72b. The first magnets 32a are configured to be magnetically attached to the first member 34 and are also configured to be magnetically attached to the ferromagnetic strip 74 of respective first attachment clip 72a. Likewise, the second magnets 32b are configured to be magnetically attached to the second member 36 and are also configured to be magnetically attached to the ferromagnetic strip 74 of the respective second attachment clip 72b. The attachment clips 72a, 72b may be attached to the non-ferromagnetic header 20 and/or footer 22. The attachment clips 72a, 72b may be attached to the window frame 18 via an adhesive (not shown) and the like. Each attachment clip 72a, 72b may have ferromagnetic properties.

Referring to FIG. 5, the attachment clip 72 may include a ferromagnetic strip 74 which includes a ferromagnetic material 43 having ferromagnetic properties. The ferromagnetic strip 74 may be fixedly attached to the attachment clip 72. The ferromagnetic material 43 may be steel, such as mild steel, and the like. The ferromagnetic material 43 is configured such that there is sufficient pull force F between the magnet 32a, 32b and the respective ferromagnetic strip 74 to retain the window covering 10 to the window frame 18, as previously described above. The ferromagnetic strip 74 presents an attachment surface 76 and the outer magnet surface 60 of the corresponding magnet 32a, 32b is configured to be magnetically attached to the attachment surface 76 of the ferromagnetic strip 74. The attachment clip extends longitudinally between a first end 88 and a second end 90 and includes a connection surface 78. The ferromagnetic strip 74 is disposed on the connection surface 78. The connection surface 78 defines a longitudinally extending groove 79 and the ferromagnetic strip 74 is fixedly disposed in the groove 79. The groove 79 is partially surrounded by a pair of longitudinally extending walls 84 and a shelf 86 interconnecting the pair of longitudinally extending walls 84, proximate the first end 88 such that the walls 84 and the shelf 86 cooperate to locate and retain the corresponding ferromagnetic strip 74 within the groove 79. The groove 79 includes a ramp 80, proximate the second end 90, to provide a lead-in between the first end 88 of the attachment clip 72 and the groove 79 to facilitate attaching and detaching the window covering 10 to/from the attachment clips 72 disposed on the window frame 18.

While FIGS. 5-8 illustrate that the attachment clips 72 are attached to the header 20 and the footer 22, it should be appreciated that if there is a header 20 having ferromagnetic properties and a footer 22 with non-ferromagnetic properties, attachment clips 72 may be used with only the footer 22, while the first magnets 32a are directly magnetically attached to the header 20, without the aid of the attachment clips 72. Likewise, the attachments may similarly be used if the header 20 has non-ferromagnetic properties and only the footer 22 has ferromagnetic properties.

Other configurations of the window covering system 16 may also be used. By way of a non-limiting example, in another embodiment, the magnets 32a, 32b are not directly retained to the casing 28 by the border 46 of the panel 30. Instead, the magnets 32a, 32b are attached directly to the window frame 18 or the attachment clips 72. Subsequently, the casing 28 and the panel 30 are magnetically attached to the magnets 32a, 32b, already attached to the window frame 18.

While the best modes for carrying out the invention have been described in detail, those familiar with the art to which this invention relates will recognize various alternative designs and embodiments for practicing the invention within the scope of the appended claims.

The invention claimed is:

1. A window covering configured for attachment to a window frame of a vehicle to at least partially cover an opening defined in the window frame, the window covering comprising:
    a casing including a first member having a first outer member surface and a second member having a second outer member surface extending in spaced relationship to the first member to define a hole therebetween;
    wherein the first outer member surface of the first member defines a first channel and the second outer member surface of the second member defines a second channel, facing in a generally opposite direction from the first channel;
    a panel operatively attached to each of the first member and the second member and covering the hole;
    a first magnet and a second magnet;
    wherein the first and second magnets each present an outer magnet surface;
    the first magnet disposed in the first channel of the first member such that the outer magnet surface is generally coplanar with the first outer member surface; and
    the second magnet disposed in the second channel of the second member such that the outer magnet surface is generally coplanar with the second outer member surface;
    wherein the outer magnet surface of each of the first and second magnets are generally coplanar with the respective first and second outer member surfaces;
    wherein the first and second magnets are configured to be magnetically attached to the window frame at the respective outer magnet surface;
    wherein the panel extends about each of the first member and the second member and covers the first and second magnets such that the panel is disposed between each of the first and second magnets and the window frame when the covering is attached to the window frame of the vehicle;
    wherein each of the first magnet and the second magnet is a permanent magnet; and
    wherein each of the first magnet and the second magnet are configured to exert a pull force sufficient to retain the window covering to the window frame of the vehicle such that the casing of the window covering does not move relative to the window frame during motion of the vehicle.

2. A window covering, as set forth in claim 1, wherein the casing further includes:
a third member interconnecting the first member and the second member; and
a fourth member extending in spaced relationship to the third member and interconnecting the first member and the second member;
wherein the third member and the fourth member cooperate with the first member and the second member to further define the hole therebetween.

3. A window covering, as set forth in claim 1, wherein each of the first magnet and the second magnet include a rare earth metal.

4. A window covering, as set forth in claim 3, wherein the rare earth metal is neodymium.

5. A window covering, as set forth in claim 4, wherein each of the first magnet and the second magnet is a neodymium magnet including an alloy of neodymium, iron, and boron.

6. A window covering, as set forth in claim 1,
wherein each of the outer magnet surfaces has an area substantially equal to 125 square centimeters.

7. A window covering, as set forth in claim 6, wherein each of the first magnet and the second magnet is block shaped and includes a length, a width, and a thickness such that the area is defined by the length and the width.

8. A window covering, as set forth in claim 7, wherein the first magnet and the second magnet each include a ledge extending longitudinally.

9. A window covering, as set forth in claim 1, wherein the casing includes a ferromagnetic material which is steel.

10. A window covering, as set forth in claim 9, wherein the steel is mild steel.

11. A window covering, as set forth in claim 2, wherein the panel extends about each of the first member, the second member, the third member, and the fourth member and covers the first magnet and the second magnet such that the panel is disposed between each of the first magnet and the second magnet and the window frame when the window covering is attached to the window frame of the vehicle.

12. A window covering, as set forth in claim 11, wherein the panel includes:
a covering portion configured to substantially cover the hole when the window covering is attached to the window frame; and
a border configured to operatively attach the covering portion to the casing.

13. A window covering, as set forth in claim 8, further comprising an attachment clip configured for attachment to the window frame and including a ferromagnetic strip having a ferromagnetic material;
wherein one of the first magnet and the second magnet is configured to be magnetically attached to the respective one of the first member and the second member and configured to be magnetically attached to the ferromagnetic strip of the attachment clip.

14. A window covering, as set forth in claim 13, wherein the attachment clip is a first attachment clip and a second attachment clip;
wherein the first magnet is configured to be magnetically attached to the first member and the ferromagnetic strip of the first attachment clip; and
wherein the second magnet is configured to be magnetically attached to the second member and the ferromagnetic strip of the second attachment clip.

15. A window covering, as set forth in claim 13, wherein the attachment clip includes a connection surface defining a longitudinally extending groove and the ferromagnetic strip is fixedly disposed in the groove.

16. A window covering, as set forth in claim 15, wherein the attachment clip extends between a first end and a second end;
wherein the groove is partially surrounded by a pair of longitudinally extending walls and a shelf interconnecting the pair of longitudinally extending walls, proximate the first end such that the walls and the ledge cooperate to locate and retain the one of the first magnet and the second magnet within the groove of the attachment clip; and
wherein the groove includes a ramp, proximate the second end.

17. A window covering system comprising:
a window frame of a vehicle including a header and a footer; and
a window covering configured for attachment to the header and the footer of the window frame to at least partially cover an opening defined between the header and the footer, the window covering including:
a casing including a first member having a first outer member surface and a second member having a second outer member surface extending in spaced relationship to the first member to define a hole therebetween;
wherein the first outer member surface of the first member defines a first channel and the second outer member surface of the second member defines a second channel, facing in a generally opposite direction from the first channel;
a panel operatively attached to each of the first member and the second member and covering the hole;
a first magnet and a second magnet;
wherein the first and second magnets each present an outer magnet surface;
the first magnet disposed in the first channel of the first member such that the outer magnet surface is generally coplanar with the first outer member surface; and
the second magnet disposed in the second channel of the second member such that the outer magnet surface is generally coplanar with the second outer member surface;
wherein the outer magnet surface of each of the first and second magnets are generally coplanar with the respective first and second outer member surfaces
wherein the first and second magnets are configured to be magnetically attached to the window frame at the respective outer magnet surface;
wherein the panel extends about each of the first member and the second member and covers the first and second magnets such that the panel is disposed between each of the first and second magnets and the window frame when the covering is attached to the window frame of the vehicle;
wherein each of the first magnet and the second magnet is a permanent magnet; and
wherein each of the first magnet and the second magnet are configured to exert a pull force sufficient to retain the window covering to the respective header and footer of the window frame of the vehicle such that the casing of the window covering does not move relative to the window frame during motion of the vehicle.

* * * * *